United States Patent [19]

Kang

[11] Patent Number: 4,876,152
[45] Date of Patent: Oct. 24, 1989

[54] WATER-PROOFING COMPOSITION
[75] Inventor: Hyung H. Kang, Northbrook, Ill.
[73] Assignee: PPG Industries, Inc., Pittsburgh, Pa.
[21] Appl. No.: 173,843
[22] Filed: Mar. 28, 1988
[51] Int. Cl.$^4$ .................... B32B 9/04; B32B 13/00; C14C 9/00
[52] U.S. Cl. .................... 428/447; 428/540; 428/703; 427/387; 427/393.6; 528/26; 528/31
[58] Field of Search .................... 427/387, 393.6; 428/447, 540, 703; 528/26, 31

[56] References Cited

U.S. PATENT DOCUMENTS

| | | | |
|---|---|---|---|
| 2,683,674 | 7/1954 | Hatcher et al. | 117/123 |
| 2,706,723 | 4/1955 | Bass | 260/42 |
| 2,810,704 | 10/1957 | Krantz | 260/33.6 |
| 2,927,909 | 3/1960 | Lyons et al. | 260/42 |
| 3,048,499 | 8/1962 | Jellinsk | 117/123 |
| 3,372,052 | 3/1968 | Polniaszek | 117/72 |
| 3,419,423 | 12/1968 | Quaal | 117/161 |
| 3,423,236 | 1/1969 | Quaal | 117/161 |
| 3,819,400 | 5/1974 | Planki et al. | 117/54 |
| 4,376,149 | 3/1983 | Martin | 428/266 |
| 4,631,207 | 12/1986 | Price | 427/387 |
| 4,722,976 | 2/1988 | Ceska | 525/301 |

FOREIGN PATENT DOCUMENTS 860522 2/1961 United Kingdom .

Primary Examiner—Michael Lusignan
Attorney, Agent, or Firm—Irwin M. Stein

[57] ABSTRACT

Described are compositions suitable for rendering masonry and other surfaces water repellent. Such compositions comprise the reaction product of a linear polysiloxane containing at least one percent of alkyl hydrogen siloxy groups and a $C_7$-$C_{30}$ alkenyl succinic anhydride. The reaction product may be diluted with an inert liquid diluent such as water or mineral spirits. The composition may be applied to masonry or other structural surfaces by techniques known in the art.

24 Claims, No Drawings

WATER-PROOFING COMPOSITION

DESCRIPTION OF THE INVENTION

The present invention relates to novel polysiloxane-containing compositions and to the treatment of materials with such polysiloxane-containing compositions to render such materials water repellent. More particularly, the invention relates to the treatment of masonry or other structural materials with novel polysiloxane-containing compositions for rendering such structural materials water repellent and to the water repellent compositions used in the treatment.

It is well known that water repellency may be conferred upon building materials such as stone, brick, concrete, cinder block, mortar, tile, stucco and equivalent materials, hereinafter collectively referred to as "masonry", by treating the surfaces thereof with various silicone compositions to render them repellent to liquid water, while at the same time maintaining their permeability to water vapor. Such treatment is advantageous as it enables water vapor within the building material to evaporate while preventing liquid water from penetrating the material.

The use of silicone compositions as water repellents on building materials, such as masonry, has been known for many years. Applied either as organic solvent solutions or aqueous alkaline solutions, the silicone compositions do not seal the pores but coat them with a hydrophobic film. This film prevents liquid water from entering the pores of the masonry by normal capillary action due to the high contact angle produced by the film; however, the film still permits the normal passage of water vapor.

In accordance with the present invention, novel polysiloxane-containing compositions are provided which, when applied to the surface of materials, e.g., structural materials such as masonry, reduce the absorption of liquid water by such material. Such "silicone" compositions may be applied also to non-structural materials, e.g., paper, wood, textiles, etc., where water repellency is a desired feature. These silicone compositions comprise the reaction product of an essentially linear polysiloxane containing at lest 1 percent of alkyl hydrogen siloxy groups and an alkenyl succinic anhydride containing from about 7 to about 30 carbon atoms in the alkenyl portion of the compound.

DETAILED DESCRIPTION OF THE INVENTION

The polysiloxane with which the alkenyl succinic anhydride may be reacted to form the silicone compositions of the present invention may be represented by the following formula:

R'R$_2$SiO(R$_2$SiO)$_x$(RHSiO)$_y$SiR$_2$R'  (I)

wherein R is a C$_1$–C$_5$ alkyl, e.g., methyl, ethyl, propyl, butyl and pentyle, R' is hydrogen or R, x has an average value of from 0 to 1000, and y has an average value of from 1 to 500. A preferred group of polysiloxanes are liner siloxane polymers according to formula I wherein R and R' are C$_1$–C$_5$ alkyl, e.g., methyl, x has an average value of from 0 to 50 and y has an average value of from 1 to 50. Such linear polysiloxanes of formula I may be represented also by the following formula:

R$_3$SiO(R$_2$SiO)$_x$(RHSiO)$_y$SiR$_3$  (II)

wherein R, x and y are as described above.

Further linear polysiloxanes that may be used to prepare the silicone compositions of the present invention may be represented by the following formula:

R$_2$HSiO(R$_2$SiO)$_x$SiHR$_2$  (III)

wherein R and x are as defined hereinbefore. A preferred group of polysiloxanes according to formula III are those wherein R is methyl and x has an average value of from 0 to 1000, e.g., 0 to 50.

The average molecular weight of the siloxane polymers of formulae I and III is at least 134 and commonly may range from about 134 to 5000, e.g., 300 to about 5000.

The polysiloxanes of formula I may be prepared, for example, by reacting (a) hexa (C$_1$–C$_5$)alkyldisiloxane, e.g., hexamethyldisiloxane, (CH$_3$)$_3$SiOSi(CH$_3$)$_3$, (b) octa(C$_1$–C$_5$)alkyl(cyclo)tetrasiloxane, e.g., octamethyl(cyclo)tetrasiloxane, [—(CH$_3$)$_2$SiO—]$_4$, and (c) 1,3,5,7-tetra(C$_1$–C$_5$)-alkyl(cyclo)tetrasiloxane, e.g., 1,3,5,7-tetramethyl(cyclo)tetrasiloxane, [—H(CH$_3$)SiO]$_4$ in the appropriate amounts using a catalytic amount of a strong mineral acid, such as sulfuric acid, at about 60°–70° C. for from about 6 to about 18 hours. After the reaction reaches an equilibrium state, the reaction mixture is neutralized, e.g., with sodium bicarbonate, filtered and volatile products removed under vacuum at 120°–150° C. The amount of alkyl, e.g., methyl, hydrogen siloxy groups in the final product may be measured by known analytical methods.

The hexaalkyldisiloxane rectant functions as an end blocker for the polysiloxane product. The higher the amount of hexaalkyldisiloxane used, the lower is the average molecular weight of the product. The amount of octaalkyl(cyclo)tetrasiloxane reactant used will approximate the value of x in formula I, while the amount of (cyclo)tetrasiloxane used will correspond approximately to the value of y in formula I. By adjusting the mole ratio of such reactants, polysiloxane compositions corresponding to that represented by formula I may be prepared.

The polysiloxanes of formula III may be prepared from, for example, 1,1,3,3-tetraalkyldisiloxane, e.g., 1,1,3,3-tetra-methyldisiloxane, H(CH$_3$)$_2$SiOSi(CH$_3$)$_2$H and octaalkyl(cyclo)tetrasiloxane, e.g., octamethyl(cyclo)tetrasiloxane, [—(CH$_3$)$_2$—SiO—]$_4$ in a manner analogous to the preceding procedure described for the polysiloxane of graphic formula I. The resultant product has the ractive hydrogen siloxy groups at the terminal ends of the polymer chain as contrasted to the random, internal distribution of the methyl hydrogen siloxy groups of the polysiloxane of graphic formula I. As described with respect to the polysiloxanes of formula I, the relative mole ratio of the reactants will determine the number of hydrogen siloxy groups compared to the number of dialkylsiloxy groups.

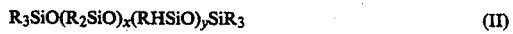

The polysiloxane product is an essentially linear polysiloxane containing at least 1 percent of alkyl hydrogen siloxy groups, e.g., from 1 to 100 percent of such groups, depending on whether the polysiloxane is that represented by formula I or formula III, and the value of x. More typically, the polysiloxane product will have from about 5 to about 20 percent of alkyl hydrogen siloxy groups.

The polysiloxane is reacted with a C$_7$–C$_{30}$ alkenyl succinic anhydride to form the water repellent silicone compositions of the present invention. While alkenyl succinic anhydrided containing more than thirty carbon atoms in the alkenyl portion of the molecule are contemplated and may be used, readily available alkenyl succinic anhydrides are those containing from 7 to 30, preferably from 7 to 18, carbon atoms. The amount of alkenyl succinic anhydride reacted with the polysiloxane may vary and will depend on the average number of alkyl hydrogen siloxy groups in the polysiloxane. While not wishing to be bound by any theory, it is believed that the olefinic bond in the alkenyl succinic anhydride reacts with the alkyl hydrogen siloxy group in the polysiloxane to bind the anhydride and siloxane by means of a silicon-carbon bond. The mole ratio of alkenyl succinic anhydride to alkyl hydrogen siloxy groups in the polysiloxane may vary from about 0.5:1 to about 2.0:1, preferably from about 0.8:1 to about 1.2:1. Preferably, sufficient of the alkenyl succinic anhydride is used so that the silicone product is substantially depleted of alkyl hydrogen siloxy groups. Reduction in the number of alkyl hydrogen siloxy groups may be determined by comparing infrared spectra of the polysiloxane reactant and the reaction product, i.e., by the substantial decrease in the silicon-hydrogen absorption band at 2150 cm$^{-1}$ in the spectrum of the product compared to the polysiloxane reactant.

Reaction of the polysiloxane and alkenyl succinic anhydride may be performed in any suitable reaction vessel at temperatures of from about 20° C. to about 200° C. in the presence of a catalytic amount of a noble metal catalyst. Typically from about 0.001 percent to about 0.05 percent of catalyst, based on the weight of the reactants, is sufficient to catalyze the addition reaction. Typically, a platinum catalyst is used to catalyze the addition reaction; however, palladium and rhodium catalysts may also be used. Platinum catalysts that may be used include chloroplatinic acid, usually as a solution in isopropanol, or platinum on alumina powder.

The addition reaction may be performed in the presence of an inert organic solvent which is capable of solubilizing both of the reactants. Such organic solvents include toluene, xylene, heptane, mineral spirits, etc. In another embodiment, the addition reaction may be performed in the absence of a solvent.

The alkenyl succinic anhydride reactant may be prepared by reaction of the corresponding alpha olefin with maleic anhydride at from 180° C. to 280° C. Many of such alkenyl succinic anhydride reactants are commercially available.

The water repellent silicone compositions of the present invention are usually diluted with an inert liquid diluent for application to the surface of the material which is to be treated. The compositions comprise usually a major amount of the diluent and a minor amount of the silicone composition. The inert liquid diluent may be an organic liquid such as mineral spirits, chlorinated solvents such as 1,1,1-trichloroethane, benzene, toluene, xylene, ketones such as methyl isobutyl ketone and methyl ethyl ketone, esters such as Cellosolve ® acetate (ethylene glycol monoethyl ether acetate) and n-butyl acetate. Mineral spirits is the preferred organic diluent. The water repellent silicone compositions of the present invention may also be dispersed in water utilizing conventional surfactants to form a dispersion or emulsion.

The amount of water repellent silicone composition present in the diluent is not critical and may vary from about 0.1 percent to about 100 percent solids content.

Relatively dense structural materials, such as limestone, require higher concentrations of the water repellent composition while more porous structural materials, such as light weight concrete block, may be effectively treated with more dilute solutions. Generally, porous materials may be treated with solutions containing 1 percent or less of the water repellent silicone composition. Generally solutions of from about 1 to about 20 parts of the water repellent composition by weight per 100 parts of diluent is effective on most materials.

In utilizing the water repellent silicone composition, the structural or other materials are surface treated with the diluted composition in such a manner that the composition penetrates deeply into the pores of the entire surface to be treated. The treated material is then allowed to dry, whereupon the surface is left with the durable water repellent coating. Application of the water repellent composition may be by brushing, spraying or by dipping the material to be treated in the diluted composition, such as by passing continuously paper or textile through a bath of the composition.

The present invention is more particularly described in the following examples which are intended as illustrative only since numerous modifications and variations therein will be apparent to those skilled in the art.

EXAMPLE 1

A linear siloxane polymer composed of dimethylsiloxy and methyl hydrogen siloxy groups and terminated with trimethyl siloxy groups was used for this example. The average molecular weight of the polysiloxane was about 2000 and methyl hydrogen siloxy groups represented about 7 percent of the weight of the polymer. This polysiloxane (285.4 grams), toluene (200.1 grams) and 1.48 grams of a 5 percent solution of chloroplatinic acid hydrate is isopropanol were charged to a one-liter round bottom reaction flask equipped with a stirrer, condenser, thermometer and an inlet for nitrogen gas. This mixture was heated under nitrogen atmosphere to about 100° C. Octenylsuccinic anhydride (78.1 grams), obtained from Milliken Chemical Co., was then slowly added to the reaction flask. The contents of the flask were subsequently heated to 120° C. and maintained at such temperature for about 18 hours. Toluene was removed from the reaction product under vacuum using a rotary evaporator and most of the platinum catalyst was filtered off to obtain a clear product.

An infrared spectrum of the reaction product was compared to the infrared spectrum of the polysiloxane starting reactant and the spectra revealed that the hydrogen-silicon absorption band at 2150 cm$^{-1}$ in the reaction product had decreased substantially compared to the starting polysiloxane reactant.

A purchased concrete test panel (approximately 7×4×0.9 centimeters) was carefully weighed and then placed in a glass jar filled with a mineral spirit solution of the aforedescribed reaction product for 4 hours. The solution was prepared by mixing 14 grams of the product and 186 grams of mineral spirits. The test concrete panel was removed from the solution and air dried for 24 hours. The dried test concrete panel was immersed in a pint of tap water for 24 hours and then removed and air dried for 3 hours to remove most of the surface moisture. The weight of the test panel was measured at each step and the amount of water which penetrated each panel estimated by the increase in weight between the steps. Results are reported in Table I and compared to a concrete test panel impregnated only with the polysiloxane starting reactant using the same procedure used for the reaction product.

TABLE I

| TEST COMPOUND | WEIGHT OF TEST CONCRETE PANEL, GRAMS | | | % WATER ABSORBED |
|---|---|---|---|---|
| | INITIAL | 4 HR TREATMENT 24 HR AIR DRY | 24 HR WATER SOAK 3 HR AIR DRY | |
| STARTING POLYSILOXANE | 73.44 | 74.66 | 77.62 | 3.96 |
| EXAMPLE 1 PRODUCT | 77.85 | 78.73 | 78.98 | 0.32 |

The data of Table I show that the concrete test panel treated with the reaction product of Example 1 absorbed significantly less water than the concrete test panel treated with the polysiloxane reactant alone.

EXAMPLE 2

The general procedure of Example 1 was followed utilizing 1763 grams of the starting polysiloxane reactant, 423 grams of octenyl succinic anhydride, 1183 grams of toluene and 4.4 grams of a 5 percent solution of chloroplatinic acid in isopropanol. The reaction was carried out at about 120° C. for 11 hours, followed by removal of the toluene solvent under vacuum. An infrared spectrum of the reaction product indicated that the silicon-hydrogen absorption band had substantially disappeared.

This reaction product was tested as a water repellent following the general procedure described in Example 1. The masonry test samples were prepared from Sakrete ® sand mix and were cast in a small Teflon ® coated muffin-type pan. Results are tabulated in Table II.

TABLE II

| TEST COMPOUND | WEIGHT OF TEST SAKRETE PRODUCT, GRAMS | | | % WATER ABSORBED |
|---|---|---|---|---|
| | INITIAL | 4 HR TREATMENT 18 HR AIR DRY | 24 HR WATER SOAK 2 HR AIR DRY | |
| MINERAL SPIRITS | 101.50 | 105.10 | 108.55 | 3.28 |
| EXAMPLE 2 PRODUCT | 94.96 | 98.97 | 99.27 | 0.30 |

The data of Table II demonstrates that the Sakrete ® test products treated with the reaction product of Example 2 absorbed significantly less water than the Sakrete ® test sample treated with mineral spirits alone.

EXAMPLE III

In accordance with the general procedure of Example 1, 204.5 grams of a polysiloxane that is terminated with dimethyl hydrogen siloxy groups, 200.5 grams of octenyl succinic anhydride, 105.6 grms of toluene and 1.85 grams of a 2.5 percent solution of chloroplatinic acid in isopropanol were charged to a reaction vessel and reacted at from 93°-135° C. for about 4 hours. The polysiloxane used was a polydimethylsiloxane endblocked with dimethyl hydrogen siloxy groups. It had an average molecular weight of about 430 and was prepared using the method described for the polysiloxane of formula III. Toluene was stripped from the reaction product under vacuum. An infrared spectrum of the reaction product showed a substantial decrease in the silicon-hydrogen absorption band compared to the spectrum of the starting polysiloxane.

The reaction product of this example was tested as a water repellent material following the general procedure described in Example 1. Masonry test samples were made from Sakrete ® sand mix and cast in round disks approximately 8.5 centimeters × 1.3 centimeters. Test results are reported in Table III.

TABLE III

| TEST COMPOUND | WEIGHT OF TEST SAKRETE PRODUCTS, GRAMS | | | % WATER ABSORBED |
|---|---|---|---|---|
| | INITIAL | 3 HR TREATMENT 18 HR AIR DRY | 44 HR WATER SOAK 1.5 HR AIR DRY | |
| STARTING POLYSILOXANE | 144.45 | 148.14 | 154.20 | 4.09 |
| EXAMPLE 3 PRODUCT | 169.50 | 174.29 | 174.86 | 0.33 |

The data of Table III show that the Sakrete ® test disk treated with the reaction product of Example 3 absorbed significantly less water than the test disk treated with the polysiloxane reactant alone.

EXAMPLE 4

The water repellent polysiloxane product obtained in Example 1 was also made by running the hydrosilation reaction without using any solvent. The linear polysiloxane used in Example 1 (2748 grams) and chloroplatinic acid hydrate (0.29 grams), freshly dissolved in methyl isobutyl ketone (7.5 grams), were charged to a five-liter round bottom reaction flask equipped with a stirrer, dripping funnel, thermometer and an inlet for nitrogen gas. This mixture was heated to about 105° C. under agitation and nitrogen. Then octenylsuccinic anhydride (636.5) was added from the dropping funnel over a period of about 7 hours while maintaining the reaction temperature at about 105° C. After the completing addition of the octenylsuccinic anhydride, the mixture was further reacted at about 90°-105° C. for an additional 16 hours to obtain a clear reaction product. Finally, the reaction mixture was filtered using a filter aid to remove the black platinum catalyst. An infrared spectrum of this product was the same as that of the product obtained in Example 1 where the product was made in toluene as a solvent.

Although the present invention has been described with reference to specific details of certain embodiments thereof, it is not intended that such details be regarded as limitations upon the scope of the invention, except as and to the extent that they are included in the accompanying claims.

I claim:
1. A composition comprising the reaction product of:
   (a) a linear polysiloxane containing at least 1 percent of alkyl hydrogen siloxy groups, which polysiloxane may be represented by the following formula:

$R'R_2SiO(R_2SiO)_x(RHSiO)_ySiR_2R'$, wherein R is a $C_1-C_5$ alkyl, R' is hydrogen or R, x has an average value of from 0 to 1000, and y has an average value of from 1 to 500, and
   (b) a $C_7-C_{30}$ alkenyl succinic anhydride, the mole ratio of alkenyl succinic anhydride to alkyl hydrogen siloxy groups in the polysiloxane being such that the reaction product is substantially depleted of alkyl hydrogen siloxy groups.

2. A composition of claim 1 wherein x haas an average value of from 0 to 50, y has an average value of from 1 to 50 and the alkenyl succinic anhydride is a $C_7-C_{18}$ alkenyl succinic anhydride.

3. A composition according to claim 2 wherein R is methyl.

4. A composition according to claim 3 wherein the polysiloxane has an average molecular weight of from about 134 to about 5000 and from about 5 to about 20 percent of alkyl hydrogen siloxy groups.

5. The composition of claim 1 wherein the composition includes an inert liquid diluent.

6. The composition of claim 5 wherein the diluent is an organic diluent.

7. The composition of claim 1 wherein the linear polysiloxane is represented by the following formula:

$R_3SiO(R_2SiO)_x(RHSiO)_ySiR_3$ wherein R is $C_1-C_5$ alkyl, the polysiloxane has an average molecular weight of from about 300 to about 5000, x has an average value of from 0 to 50, y has an average value of from 1 to 50, and the alkenyl succinic anhydride is a $C_7-C_{18}$ aleknyl succinic anhydride.

8. The composition of claim 1 wherein the linear polysiloxane is represented by the following formula, $R_2HSiO(R_2SiO)_xSiHR_2$ wherein R is a $C_1-C_5$ alkyl, x has an average value of from 0 to 1000, and the alkenyl succinic anhydride is a $C_7-C_{18}$ aleknyl succinic anhydride.

9. The composition of claim 8 wherein x has an average value of from 0 to 50.

10. The composition of claim 7 wherein the alkenyl succinic anhydride is octenyl succinic anhydride.

11. The composition of claim 8 wherein the alkenyl succinic anhydride is octenyl succinic anhydride.

12. The composition of claim 6 wherein the organic diluent is mineral spirits.

13. The composition of claim 10 wherein R is methyl and the polysiloxane contains from about 5 to about 20 percent of alkyl hydrogen siloxy groups.

14. The composition of claim 11 wherein R is methyl and the polysiloxane contains from about 5 to about 20 percent of alkyl hydrogen siloxy groups.

15. A method for rendering masonry water repellent which comprises applying to the masonry surface a composition of a major amount of inert liquid diluent and a minor amount of the reactin product of:
   (a) a linear polysiloxane containing at least 1 percent of alkyl hydrogen siloxy groups, which polysiloxane may be represented by the following formula:

$R'R_2SiO(R_2SiO)_x(RHSiO)_ySiR_2R'$, wherein R is a $C_1-C_5$ alkyl, R' is hydrogen or R, x has an average value of from 0 to 1000, and y has an average value of from 1 to 500, and
   (b) a $C_7-C_{30}$ alkenyl succinic anhydride, the mole ratio of alkenyl succinic anhydride to alkyl hydrogen siloxy groups in the polysiloxane being such that the reaction product is substantially depleted of alkyl hydrogen siloxy groups.

16. The method of claim 15 wherein the composition contains from about 1 to 20 parts by weight of the reaction product per 100 parts by weight of diluent.

17. The method of claim 16 wherein the diluent is mineral spirits.

18. The method of claim 16 wherein the solvent is water.

19. The method of claim 16 wherein R is methyl, x has an average value of from 0 to 50, y has an average value of from 1 to 50, the alkenyl succinic anhydride is a $C_7-C_{18}$ alkenyl succinic anhydride, and the polysiloxane has from about 50 to about 20 percent of alkyl hydrogen siloxy groups.

20. The method of claim 15 wherein the linear polysiloxane is represented by the following formula:

$R_3SiO(R_2SiO)_x(RHSiO)_ySiR_3$ wherein R is $C_1-C_5$ alkyl, the polysiloxane has an average molecular weight of from about 300 to about 5000, x has an average value of from 0 to 50, y has an average value of from 1 to 50, and the alkenyl succinic anhydride is a $C_7-C_{18}$ alkenyl succinic anhydride.

21. The method of claim 15 wherein the linear polysiloxane is represented by the following formula, $R_2HSiO(R_2SiO)_xSiHR_2$ wherein R is a $C_1-C_5$ alkyl, x has an average value of from 0 to 1000, and the alkenyl succinic anhydride is a $C_7-C_{18}$ alkenyl succinic anhydride.

22. The method of claim 20 wherein R is methyl and the polysiloxane has from about 5 to about 20 percent of alkyl hydrogen siloxy groups.

23. The method of claim 21 wherein R is methyl, x has an average value of from 0 to 50 and the polysiloxane has from about 5 to about 20 percent of alkyl hydrogen siloxy groups.

24. Masonry containing a water repellent coating of the composition of claim 1.

* * * * *

UNITED STATES PATENT AND TRADEMARK OFFICE
CERTIFICATE OF CORRECTION

PATENT NO. :  4,876,152

DATED     :  Oct. 24, 1989

INVENTOR(S) :  Hyung H. Kang

It is certified that error appears in the above-identified patent and that said Letters Patent is hereby corrected as shown below:

Claim 2, column 7, line 20, "haas" should be --has--.

Claim 7, column 7, line 43, "aleknyl" should be --alkenyl--.

Claim 8, column 7, line 50, "aleknyl" should be --alkenyl--.

Claim 19, column 8, line 33, "50" should be --5--.

Signed and Sealed this

Twenty-fifth Day of September, 1990

Attest:

HARRY F. MANBECK, JR.

*Attesting Officer*    *Commissioner of Patents and Trademarks*